US012375737B1

(12) United States Patent
Chen et al.

(10) Patent No.: US 12,375,737 B1
(45) Date of Patent: Jul. 29, 2025

(54) SYSTEM AND METHODS FOR PROVIDING A CONVERGED ADVERTISEMENT INSERTION ARCHITECTURE IN A CONTENT DELIVERY NETWORK

(71) Applicant: Charter Communications Operating, LLC, St. Louis, MO (US)

(72) Inventors: David W. Chen, Aurora, CO (US); Timothy Whitton, Aurora, CO (US); David E. Agranoff, Golden, CO (US); Manuel Martinez, Beaverton, OR (US); Vipul Patel, Parker, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 46 days.

(21) Appl. No.: 18/421,585

(22) Filed: Jan. 24, 2024

(51) Int. Cl.
*H04N 21/234* (2011.01)
*H04N 21/433* (2011.01)

(52) U.S. Cl.
CPC ... *H04N 21/23424* (2013.01); *H04N 21/4331* (2013.01)

(58) Field of Classification Search
CPC ..................... H04N 21/23424; H04N 21/4331
See application file for complete search history.

(56) References Cited

U.S. PATENT DOCUMENTS

| | | | |
|---|---|---|---|
| 8,316,392 B2 | 11/2012 | Ahanger et al. |
| 10,063,612 B2 | 8/2018 | Brinkley et al. |
| 10,469,882 B2 | 11/2019 | Pathak et al. |
| 10,536,755 B1 | 1/2020 | Neill et al. |
| 10,911,794 B2 | 2/2021 | Badawiyeh et al. |
| 2023/0199235 A1 | 6/2023 | Giladi |

*Primary Examiner* — Rong Le
(74) *Attorney, Agent, or Firm* — THE MARBURY LAW GROUP, PLLC

(57) ABSTRACT

Systems, methods, and devices for supporting advertisement (ad) insertion into a media stream. The device receives notification of an upcoming ad break within the media stream, determines whether the upcoming ad break contains only pre-scheduled spots, and if the upcoming ad break does not contain only pre-scheduled spots, determines whether the upcoming ad break includes any addressable spot based on a broadcasting schedule stored on the device. Otherwise, the device sends a request with information about the at least one addressable spot and the upcoming ad break to an ADS proxy hosted by a client ad server unit within the content delivery network, receives a response message from the ADS proxy identifying a default asset for each addressable spot, retrieves the at least one default asset from a content distribution network, and sends the at least one default asset to a splicer for insertion within the media stream.

30 Claims, 7 Drawing Sheets

SYSTEM AND METHODS FOR PROVIDING A CONVERGED ADVERTISEMENT INSERTION ARCHITECTURE IN A CONTENT DELIVERY NETWORK

BACKGROUND

Video advertisement is a major part of today's television experience. Integrating advertisements into media streams (e.g., TV shows, online video streams, etc.) is a desired feature in modern broadcasting and media delivery systems. The integration of advertisements requires precise timing and subtle execution to present users with the advertisements without degrading the viewing experience.

Specifically, delivery of secondary content such as advertisements may comprise a major source of revenue for commercial television or movie distributors, and for the network operator. For example, where the secondary content comprises advertisements, the advertisements may be a main source of income for national television broadcasters and their local over-the-air affiliates. Cable, satellite, HFCu, and other content distribution networks, as well as Internet content providers, also derive income from the sale of advertising time and insertion opportunities (and "impressions" associated therewith).

All these applications create a substantial advertisement market with high demand across the advertising landscape. However, these technologies typically support a limited number of applications. Further, the existing technology for inserting video advertisements into a content video has evolved differently to support custom or standard compliant advertisement management systems, analytics systems, targeted advertisement, video resolution and other aspects.

Moreover, an advertiser may seek to maximize the return on their advertising investment by targeting specific users or groups of users that are likely to be most receptive to the commercial message embodied in the advertisements. For example, during national broadcasts, it may be desirable to include certain types of advertising at specific demographic or geographic segments of an MSO's subscriber base. One way of targeting viewers involves selecting advertisements based on a geographical region in which the advertisement is to be delivered (e.g., an "advertisement zone"). In this manner, certain advertising content may be provided to viewers in one local or regional area which is different than that provided to the viewers in a different local or regional area.

New and improved advertisement insertion solutions that offer scalability, reliability, and precise content integration without increasing complexity or costs would be beneficial to content and service providers as well as consumers of their services. Specifically, combining different advertising insertions into the same system and on the same channels without constraint is desired.

SUMMARY

The various aspects include methods of supporting advertisement (ad) insertion into a media stream within a content delivery network, which may include receiving notification of an upcoming ad break within the media stream, and determining whether the upcoming ad break contains only pre-scheduled spots. Various aspects may further include, in response to determining that the upcoming ad break does not contain only pre-scheduled spots, determining whether the upcoming ad break includes any addressable spot based on a broadcasting schedule stored on the one or more server computing device. Various aspects may further include, in response to determining that the upcoming ad break includes at least one addressable spot, sending a request with information about the at least one addressable spot and the upcoming ad break to an ad decision server proxy (ADS proxy) hosted by a client ad server unit within the content distribution network, receiving a response message from the ADS proxy, retrieving the at least one default asset from a content distribution network (CDN), and sending the at least one default asset to a splicer for insertion within the media stream. In some aspects, the response message may identify a default asset for each of the at least one addressable spot. In some aspects, the response message from the ADS proxy may include a placeholder for any pre-scheduled spot within the upcoming ad break. In some aspects, sending the request with information about the at least one addressable spot and the upcoming ad break to the ADS proxy may include sending a video ad serving template (VAST) request message, and receiving the response message from the ADS proxy may include receiving a VAST response generated by the ad decision server.

In some aspects, retrieving the at least one default asset from the CDN may include determining whether the at least one default asset is available in a local cache from previous download, and downloading the at least one default asset from the CDN in response to determining that the at least one default asset is not available in a local cache.

Various aspects may further include, in response to determining that the upcoming ad break contains only pre-scheduled spots, identifying a pre-selected asset for each spot in the upcoming ad break based on the broadcasting schedule, retrieving the identified pre-selected assets from the CDN, and sending the pre-selected assets to the splicer for insertion within the content stream.

In some aspects, retrieving the identified pre-selected assets from the CDN may include determining whether each identified pre-selected asset is available in a local cache from a previous download, and downloading from the CDN any pre-selected asset not available in a local cache from a previous download.

Various aspects may further include, in response to determining that the upcoming ad break does not include any addressable spots, sending a request to the ad decision server, receiving a response message from the ad decision server identifying a default asset for each dynamic spot within the upcoming ad break, retrieving the identified default asset for each dynamic spot, and sending the retrieved default assets for each dynamic spot to the splicer for insertion within the content stream. In some aspects, the request may include information identifying all dynamic spots within the upcoming ad break.

In some aspects, the response from the ad decision server may include a placeholder for any pre-scheduled spot within the upcoming ad break. In some aspects, retrieving the identified default asset for each dynamic spot may include determining whether the identified default asset is available in a local cache from a previous download, and downloading the identified default asset from the CDN in response to determining that the identified default asset is not available in a local cache from a previous download.

In some aspects, the request sent to the ad decision server may include a video ad serving template (VAST) request message, and the response message received from the ad decision server identifying a default asset for each dynamic spot may include a VAST response message.

Various aspects may further include downloading the broadcasting schedule from the ad decision server.

Further aspects may include a computing device having a processing system configured with processor-executable instructions to perform various operations corresponding to the methods summarized above. Further aspects may include a non-transitory processor-readable storage medium having stored thereon processor-executable instructions configured to cause a processing system to perform various operations corresponding to the method operations summarized above. Further aspects may include a computing device having various means for performing functions corresponding to the method operations summarized above.

BRIEF DESCRIPTION OF THE DRAWINGS

The accompanying drawings, which are incorporated herein and constitute part of this specification, illustrate exemplary embodiments of the claims, and together with the general description given and the detailed description, serve to explain the features herein.

DETAILED DESCRIPTION

Figure 1:
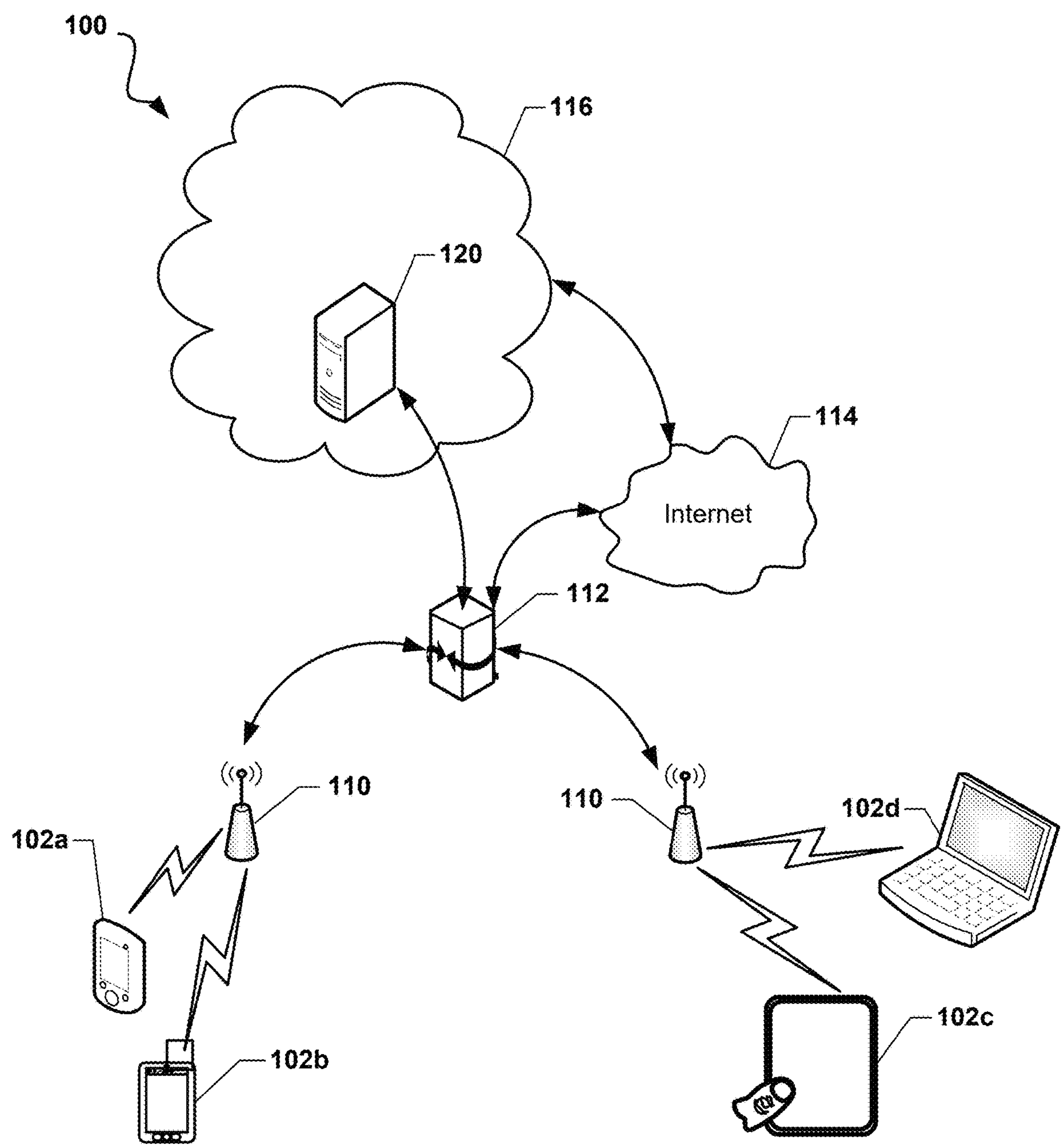
FIG. 1 is a system block diagram of a communications network suitable for use with various embodiments.

Various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the claims.

The embodiments may include or provide an integrated and systematic solution for advertisement distribution in splicer redundancy architectures. The embodiments may improve the performance and function of the network and network constituent components by implementing an advertisement insertion solution that directly addresses the complexity and inflexibility of the other related systems, streamlines the advertisement insertion process, reduces the potential for errors, and provides robust and continuous service delivery for broadcasting and media organizations.

The term "service provider network" is used generically herein to refer to any network suitable for providing consumers with access to the Internet or IP services over broadband connections and may encompass both wired and wireless networks/technologies. Examples of wired network technologies and networks that may be included within a service provider network include active Ethernet networks, asymmetric digital subscriber line (ADSL) technologies, cable networks, data over cable service interface specification (DOCSIS) networks, enhanced ADSL (ADSL2+), Ethernet, fiber optic networks, fiber-to-the-x (FTTx) technologies, hybrid-fiber-cable (HFC) networks, local area networks (LAN), metropolitan area networks (MAN), passive optical networks (PON), satellite networks, wide area networks (WAN), 10 Gigabit Symmetrical Passive Optical Network (XGS-PON), etc. Examples of wireless network technologies and networks that may be included within a service provider network include third generation wireless mobile communication technology (3G), third generation partnership project (3GPP), 3GSM, fourth generation wireless mobile communication technology (4G), fifth generation wireless mobile communication technology (5G), sixth-generation wireless (6G), advanced mobile phone system (AMPS), Bluetooth®, CDMA systems (e.g., cdmaOne, CDMA2000), digital enhanced cordless telecommunications (DECT), digital AMPS (IS-136/TDMA), enhanced data rates for GSM evolution (EDGE), evolution-data optimized (EV-DO), general packet radio service (GPRS), global system for mobile communications (GSM), high-speed downlink packet access (HSDPA), integrated digital enhanced network (iDEN), land mobile radio (LMR), long term evolution (LTE) systems, low earth orbit (LEO) satellite internet technologies, massive multiple input multiple output (MIMO), millimeter-wave (mmWave) technologies for higher-speed wireless communication, new radio (NR), next-generation wireless systems (NGWS), universal mobile telecommunications system (UMTS), Wi-Fi 7 (802.11be), Wi-Fi Protected Access I & II (WPA, WPA2), wireless local area network (WLAN), worldwide interoperability for microwave access (WiMAX), etc. Each of these wired and wireless technologies discussed herein includes the transmission and reception of data, as well as the exchange of signaling and content messages. It should be noted that references to specific terminology and technical details pertaining to individual communications standards or technologies are provided solely for the purpose of illustration. These references should not be construed as narrowing the scope of the claims to any particular communication system or technology unless specifically recited in the claim language.

The term "content delivery network" may be used herein to refer to a service provider network that supplies consumable content, regardless of delivery platform or network infrastructure.

The terms "computing device," "user device" and "user equipment" (UE) may be used generically and interchangeably herein to refer to a broad range of devices such as, but not limited to, access nodes (AN), bridged residential gateways (BRG), cellular telephones, customer-premises equipment (CPE), digital video recorders (DVRs), home networking adapters, internet access gateways, laptops, modems, network switches, personal digital assistants (PDAs), portable multimedia players, rack-mounted computers, residential gateways (RG), routers, satellite or cable set-top boxes (STBs), smart televisions, smartphones, smartwatches, streaming media devices (for example, devices similar to ROKU™), tablet computers, voice-controlled assistants, wearable fitness and health-tracking devices, and wireless gaming controllers. These devices commonly include a programmable processor, memory, and/or circuitry for providing the functionality described herein. As used herein, the term "client device" includes, but is not limited to, digital set-top boxes (e.g., DSTBs), personal computers (PCs), and minicomputers, whether desktop, laptop, or otherwise, and mobile devices such as handheld computers, tablets, phablets, personal digital assistants (PDAs), personal media devices (PMDs), and smartphones.

The terms "consumer premises equipment" (CPE) and "consumer device" refer without limitation to any type of electronic equipment for use within a consumer's or user's premises and connected to a content distribution network.

The term "consumer device" includes terminal devices that have access to digital television content via a satellite, cable, or terrestrial network. The term "consumer premises equipment" (CPE) includes such electronic equipment such as set-top boxes (e.g., DSTBs or IPTV devices), televisions, cable modems (CMs), embedded multimedia terminal adapters (eMTAs), whether stand-alone or integrated with other devices, digital video recorders (DVR), gateway storage devices, and ITV personal computers.

The term "set-top box" (STB) refers to a device that generally contains a TV-tuner input and displays output to a television set and an external source of signal, turning the source signal into content for display.

As used herein, the term "computer program" or "software" is meant to include any sequence or human or machine cognizable steps which perform a function. Such program may be rendered in virtually any programming language or environment including, for example, Python, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (e.g., BREW), C#, and the like.

The terms "component," "system," and the like may be used herein to refer to a computer-related entity, such as hardware, firmware, a combination of hardware and software, software, or software during its execution. These entities may be configured to carry out specific operations or functionalities. For example, a component may encompass a process operating on a processor, a processor itself, an object, an executable, a thread of execution, a program, or a computing device. As an illustrative example, both an application running on a computing device and the computing device itself could be termed a component. One or more components may be situated within a process and/or thread of execution and/or may be localized on a single processor or core or distributed across multiple processors or cores. In addition, these components may execute from various non-transitory computer-readable media that have various instructions and/or data structures stored thereon. Components may communicate by way of local and/or remote processes, function or procedure calls, electronic signals, data packets, memory read/writes, and other known computer, processor, and/or process-related communication technologies.

The term "system on chip" (SoC) is used herein to refer to a single integrated circuit (IC) chip that contains multiple resources or independent processors integrated on a single substrate. A single SoC may contain circuitry for digital, analog, mixed-signal, and radio-frequency functions. A single SoC may include a processing system that includes any number of general-purpose or specialized processors (e.g., network processors, digital signal processors, modem processors, video processors, etc.), memory blocks (e.g., ROM, RAM, Flash, etc.), and resources (e.g., timers, voltage regulators, oscillators, etc.). For example, an SoC may include an applications processor that operates as the SoC's main processor, central processing unit (CPU), microprocessor unit (MPU), arithmetic logic unit (ALU), etc. A SoC processing system also may include software for controlling integrated resources and processors, as well as for controlling peripheral devices.

The terms "advertisement" (ad), "ad video," and "asset" may be used interchangeably herein to refer to a secondary content video that promotes a product or service to a consumer and that is shown to the consumer in addition to the primary content video. An ad is herein specifically differentiated from a primary content video in that it is an advertisement system, not a consumer, who selects a time for watching the advertisement.

The terms "ad spot" and "spot" may be used interchangeably herein to refer to a timeframe within a primary content video that is designated for displaying secondary content, in particular ad videos or streams.

The term "ad spot attributes" refers to a set of attributes and/or metadata that characterize an ad spot. Such attributes may include, for example, a start time (i.e., timing of start relative to a content video timeline), duration (i.e., length of time frame allocated for the ad spot), origin, and others.

The term "Content Distribution Network" (CDN) refers to an Internet Protocol (IP) based network element that is used for storing and caching of video and/or other media for efficient retrieval.

The term "splicer" may be used herein to refer to a computing device or system configured to operate in conjunction with IP streaming technologies to integrate content, such as advertisements, into a media stream without interrupting the continuity of that stream. Some embodiments may include a splicer that implements a redundancy architecture that helps ensure that service is uninterrupted and/or that content delivery is consistent across various outputs. The role of the splicer may extend to managing and synchronizing with cue requests (e.g., SCTE-30 signals, etc.) to facilitate the precise insertion of advertisements at designated intervals as dictated by the broadcasting schedule or content delivery requirements.

The term "SCTE-30" may be used herein to refer to an ANSI and Society of Cable and Telecommunications Engineers (SCTE) standard entitled "Digital Program Insertion Splicing API," which is used within the broadcasting and media industry. SCTE-30 may govern the signaling for advertisement insertion opportunities within a media stream. Specifically, SCTE-30 cue requests may be messages sent from one or more splicer to an advertisement server, conveying information about the precise timing and placement for ads within the programming content. These messages may facilitate automated synchronization of ad insertion across various devices and platforms and/or help ensure that ads are embedded at designated intervals within the media stream. SCTE-30 messages may facilitate the synchronization of splicers with broadcasting schedules to help support a more seamless viewing experience.

The term "SCTE-35" may be used herein to refer to an ANSI and SCTE standard entitled "Digital Program Insertion Cueing Message for Cable," which is used within the broadcasting and media industry to specify signaling that indicates the insertion points for secondary content such as advertisements within a media stream. The SCTE-35 standard outlines the cues for the start and end of media segments and allows for accurate placement of content by splicers and other related devices. That is, SCTE-35 signals may pinpoint the precise moments for advertisement insertion.

For ease of reference, some embodiments are discussed with reference to broadcast. However, it should be understood that the term "broadcast" encompasses unicast and multicast, and nothing in this application should be interpreted as limiting to unicast, broadcast or multicast express recited as such in the claims.

The seamless integration of secondary content (e.g., advertisements, etc.) into media streams is an important feature of modern broadcasting and media services. SCTE-30 and SCTE-35 are industry-standard protocols that enable precise and timely insertion of content. SCTE-35 signals may be embedded in the media stream to mark specific points for content insertion. The detection of SCTE-35 signals by a splicer, using SCTE-30 messages, triggers the insertion of the designated content (e.g., advertisements, etc.) at the precise moment specified by the signal.

There are limitations and technical challenges associated with current and conventional advertisement insertion solutions. For example, linear advertising delivery approaches to reach a demographic group such as audience bundles usually have a low degree of granularity in terms of the target audience. Therefore, there is a lack of efficacy at reaching desired subsets of subscribers, and unnecessary resource consumption.

The various embodiments include devices equipped with components and processing systems configured to overcome these and other technical challenges and limitations associated with conventional solutions. In particular, various embodiments provide a combined system in the form of a converged advertisement platform that supports selection and insertion of secondary content (e.g., ads) across different types of spots, broadcast networks, and scheduling types. The converged ad platform may improve the broadcast workflow by making ad assets available on a cloud network rather than requiring a centra server to push ads to local servers.

Specifically, the converged ad platform may include an ad insertion server and an ad decision server, among other entities. When an upcoming advertising break occurs in an input media (e.g., video/audio) stream, the ad insertion server may select an appropriate ad based on referencing a pre-loaded broadcasting schedule and/or sending a request to the ad decision server.

In particular, the ad break may include different types of spots (e.g., pre-scheduled, addressable, or dynamic), the attributes for which may be indicated within the schedule on the ad insertion server. For example, to identify a pre-scheduled (i.e., pre-sold) spot, the schedule may include a spot identifier (i.e., Spot ID) with the name of the ad asset to be inserted. The identified ad asset may be downloaded from a cloud network, such as a content distribution network (CDN), if not already available in a local cache of the ad insertion server. The ad insertion server may identify a dynamic spot or an addressable spot within the ad break based on corresponding identifiers within the schedule, such as different prefix strings in the Spot ID. In various embodiments, an addressable spot may be an ad spot in which targeted ads to different audience segments may be delivered within the same programming. In various embodiments, a dynamic spot may be an ad spot for which a default ad is selected in real-time rather than in advance.

In response to identifying a dynamic spot, the ad insertion server may send a request to the ad decision server, such as a video ad service template (VAST) request. The ad selected by the ad decision server for the dynamic spot may be downloaded from the CDN and inserted into the spot by the ad insertion server.

In response to identifying an addressable spot, the ad insertion server may send a request (e.g., a VAST request) to a proxy for the ad decision server (ADS proxy) that is hosted by a client ad server unit. In various embodiments, the ad decision server may select a default ad for the primary channel, and optionally one or more variant ads for different switched digital video (SDV) channels corresponding to various target groups/users. The ad decision server may send a response to the client ad server unit identifying a default and variant ad assets. The default ad selection may be passed from the client ad server unit to the ad insertion server, which may retrieve the default ad asset from the CDN. Further, any variant ad selection may be used by the client ad server unit to retrieve the corresponding ad asset(s) from the CDN.

The client ad server unit may communicate with customer devices by receiving ad selection requests, providing tuning information for the channel on which a particular ad variant will be streamed, and streaming variant ad asset(s) to customer devices accordingly.

In some embodiments, if a channel has ad insertion enabled but no ad break schedule is available, the ad insertion server may send a request (e.g., a VAST request) to the ad decision server to identify default ads to be inserted for all the spots and ad breaks for that channel.

The various embodiments may be implemented within a variety of communications systems, an example of which is illustrated in FIG. 1. The communications system 100 may be used by a multiple system operator (MSO), internet service provider (ISP), cellular service provider, or other type of service provider that facilitates messaging and/or other network-based messaging/signaling between one or more server connected to the Internet or other external network.

The communications system 100 may include a plurality of end user devices 102 (e.g., 102*a*, 102*b*, 102*c*, 102*d* collectively referred to as end user devices 102), which may be configured to communicate via a Wi-Fi network, a cellular telephone network, a radio access network, a WiMAX network, and/or other well-known technologies. End user devices 102 may each be configured to receive and transmit data and control signals to and from an access point 110 (e.g., a wireless access point, router, hub, broadband gateway, base station, etc.) which may be coupled to a controller operable to transmit the data and control signals between to other network destinations. The controller may be, for example, a service gateway, wireless LAN controller (WLC), cellular base station, radio network controller, etc. The access point 110 may communicate with an access gateway 112 (e.g., a packet data network gateway (PGW), a cable modem termination system (CMTS), a wireless access gateway (WAG), broadband network gateway, etc.) that serves as the primary point of entry and exit for end user device traffic. The access gateway 112 may be implemented in a single computing device or in many computing devices.

Functions of the access gateway 112 may include, but are not limited to, forwarding data and control signals to network components as user data packets, providing connectivity to external data sources/networks, managing and storing network/internal routing information, and/or acting as a bridge between different technologies (e.g., Wi-Fi, broadband, 3G/4G/5G systems, etc.). The access gateway 112 may also coordinate the transmission and reception of data to and from the Internet 114, and the transmission and reception of voice, data and control information to and from an external service network connected to the Internet 114, as well as other access points 110.

The access gateway 112 may connect the end user devices 102 to a service network 116 either directly or via the Internet 114. The service network 116 may control a number of services for individual subscribers, such as management of billing data and selective transmission of data, such as multimedia data, to a specific end user device 102. The service network 116 may be implemented in a single computing device or in many computing devices, and typically includes one or more server 120, such as a media server of a content provider, a communication server, etc. Each end user device 102 may be, for example, a smartphone, a laptop computer, a tablet computer, a smartphone, or any other suitable end point device capable of connecting to a LAN. In general, the end user devices 102 may include a platform that can receive and execute software applications, data and/or commands transmitted over the communication network that may ultimately come from the service network 116, the Internet 114 and/or other remote servers and networks.

The various embodiments are particularly useful with broadband (e.g., fiberoptic, wireless satellite, cable modem or DSL modem etc.) networks to obtain access to service provider core network. However, the embodiments may also be implemented over any combination of wireless and/or wired networks and access protocols, with no changes to the methods.

The service provider in various embodiments may implement a number of services and functions to support cable and/or Internet services for subscribers. For example, a service provider network may include an operations support system/business support system (OSS/BSS) that provides network management and/or other functions.

Content delivery technologies in the various embodiments may particularly relate to methods of transferring video to an end user device 102. Such delivery technologies may include, but are not limited to, quadrature amplitude modulation (QAM), switched digital video (SDV), data over cable service interface specification (DOCSIS), Ethernet, IP, and/or Wi-Fi. In various embodiments, delivery may be broadcast (i.e., to an entire population of end user devices 102), multicast (i.e., to a subset of the end user devices 102), or unicast (i.e., to a single end user device 102).

The term “system-on-chip” or “SoC” is used herein to refer to a set of interconnected electronic circuits typically, but not exclusively, including multiple hardware cores, a memory, and a communication interface. The hardware cores may be of a variety of different types of processors, such as a multi-core central processing unit (CPU), a multi-core digital signal processor (DSP), a multi-core accelerated processing unit (APU), and a multi-core auxiliary processor.

Figure 2:
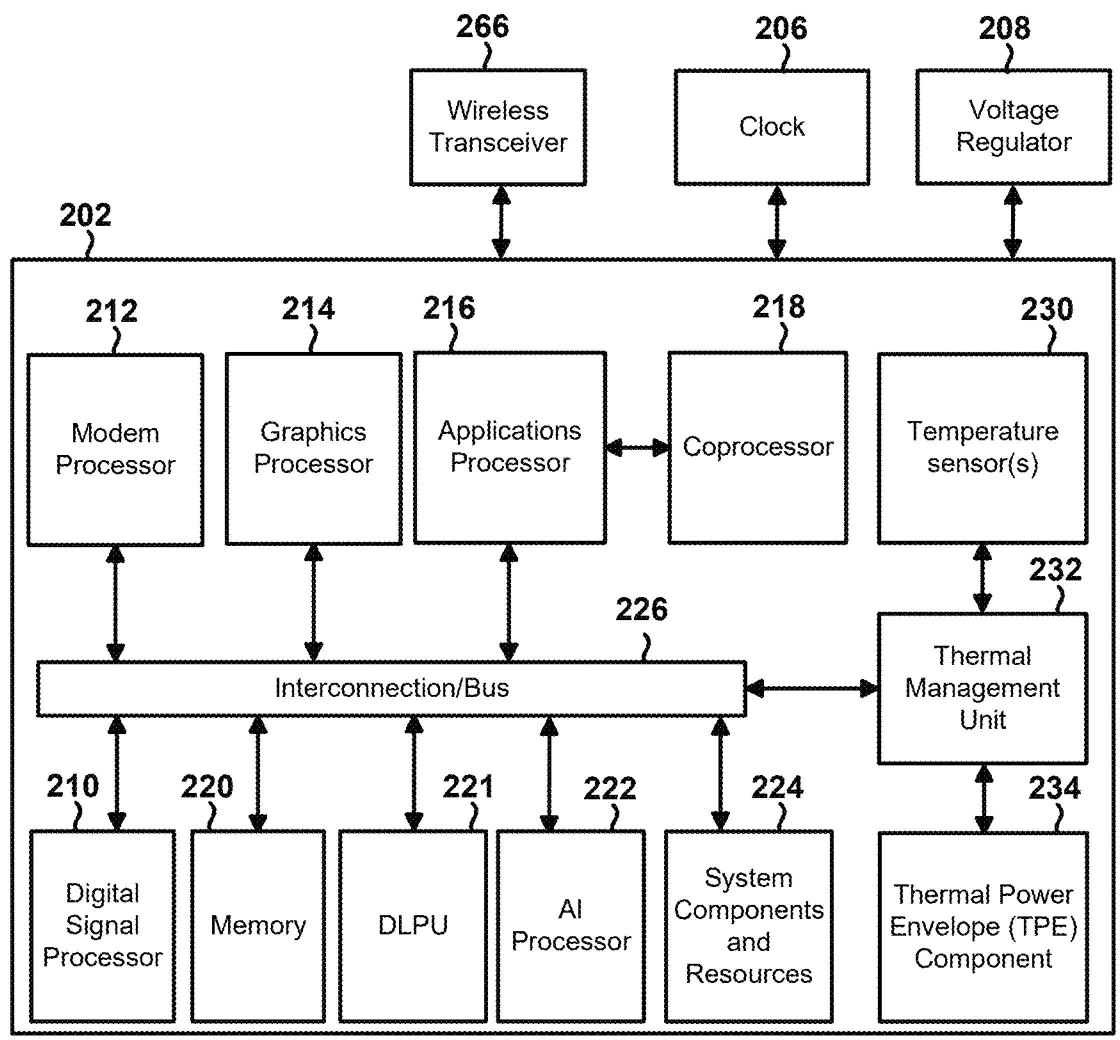
FIG. 2 is a component block diagram illustrating a computing device suitable for implementing an embodiment.

Various embodiments may be implemented on a number of single-processor and multiprocessor computer systems, including a system-on-chip (SoC) or system in a package (SIP). FIG. 2 illustrates an example computing system 200 architecture that may be used in a computing system implementing the various embodiments.

The example SOC 200 includes SoC 202, a clock 206, a voltage regulator 208, and wireless transceiver 266 configured to support contemporary wireless standards. The SoC 202 may include a digital signal processor (DSP) 210, a modem processor 212 tailored for the latest network standards, a graphics processor unit (GPU) 214, an application processor 216, various coprocessors 218 (e.g., vector processors), deep learning processing units (DLPU) 221, artificial intelligence (AI) processors 222, along with memory 220 and system components and resources 224. An interconnection/bus module 226, temperature sensors 230, thermal management unit 232, and thermal power envelope (TPE) component 234 also form part of the SoC.

In some embodiments, the SoC 202 may operate as the central processing unit (CPU) within a computing device, executing software application instructions and managing arithmetic, logical, control, and input/output (I/O) operations as specified. In some embodiments, the SoC 202 may interface with other components through the interconnection/bus module 126. The array of processors 210, 212, 214, 216, 218, 221, 222 may be interconnected and communicate with memory elements 220, system components, resources 224, and a thermal management unit 232 via interconnection/bus module 226, which may include a matrix of adaptable logic gates or embody a bus architecture such as CoreConnect or advanced microcontroller bus architecture (AMBA). Advanced interconnects, including high-performance network-on-chip (NoC) systems, may also be used to facilitate communications.

Each processor 210, 212, 214, 216, 218, 221, 222 may include multiple cores, allowing independent operation from other processors or cores. For example, one part of SoC 202 may run an operating system such as LINUX, while another operates on a different platform, such as Microsoft Windows 10. In addition, any or all of the processors 210, 212, 214, 216, 218, 221, 222 may be a part of a synchronous or asynchronous processor cluster architecture.

Any of the processors 210, 212, 214, 216, 218, 121, 122 may operate as the CPU in the computing environment and/or may be nodes within one or more CPU clusters. CPU clusters are interconnected nodes configured for collaborative computing, with each node potentially running its own operating system with dedicated CPU, memory, and storage. Tasks assigned to a CPU cluster may be subdivided and processed in parallel, enhancing speed and reliability.

The SoC 202 may include or integrate various system components, resources, and specialized circuits for managing sensor inputs, converting analog signals to digital, managing wireless communications, and processing media content for applications like web browsers. These components and resources 224 may include but are not limited to, power amplifiers, voltage regulators, oscillators, phase-locked loops, peripheral bridges, memory and system controllers, and interfaces for peripheral devices such as cameras, displays, and wireless modules.

The SoC 202 may also include an input/output module for interfacing with external components like the clock 206, voltage regulator 208, and a state-of-the-art wireless transceiver 266, supporting the latest communication protocols. These external resources may be allocated among various internal SoC processors or cores to improve performance.

In addition to the example SoC 200 discussed above, various embodiments may be implemented in a wide variety of computing systems, which may include a single processor, multiple processors, multicore processors, or any combination thereof.

As described, a combined advertising system of the various embodiments may reduce infrastructure requirements by providing secondary content of various types through a network, and interfacing different advertisement spots within a single system.

Figure 3:
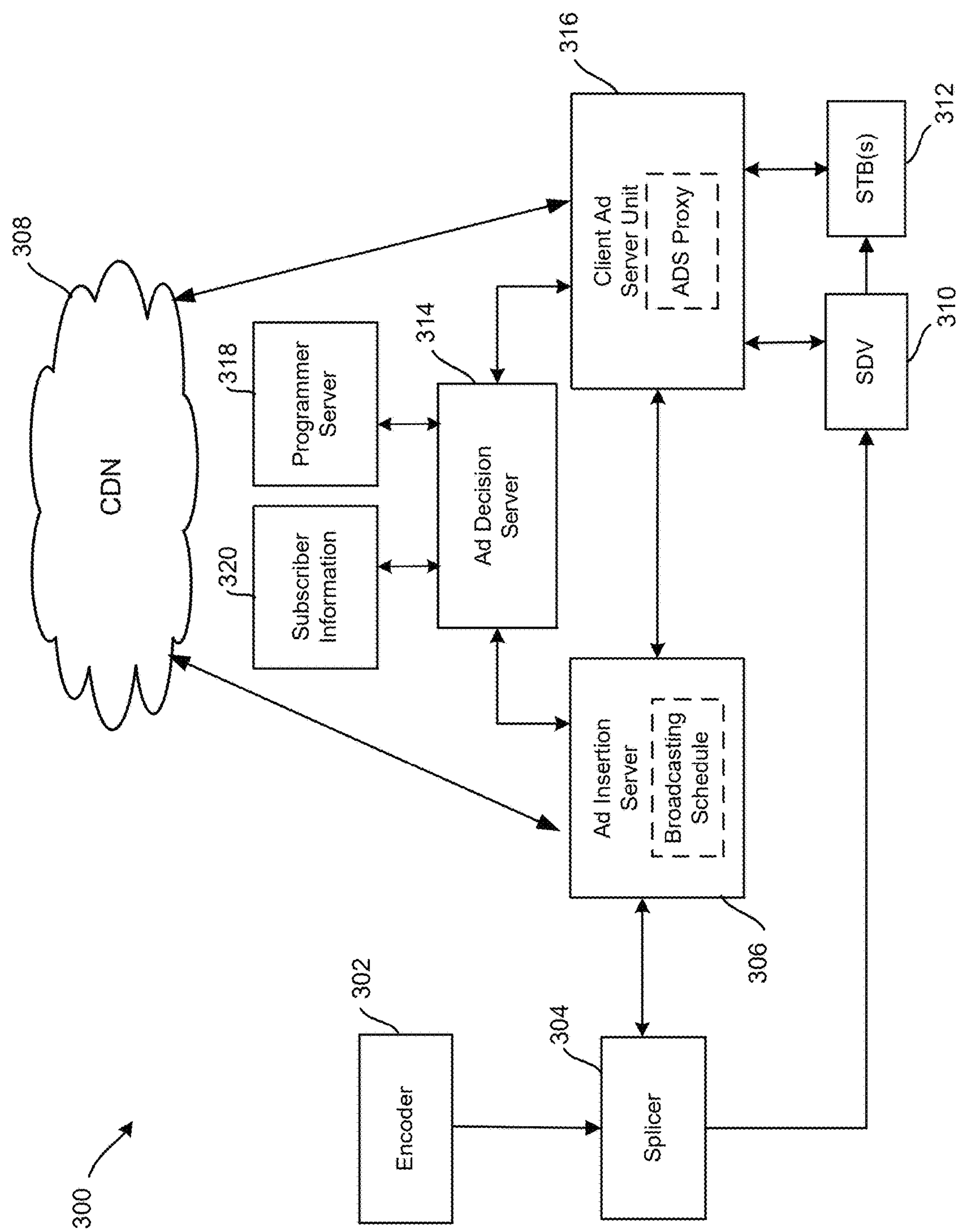
FIG. 3 is a block diagram illustrating an example software architecture for implementing a converged advertisement platform according to various embodiments.

FIG. 3 illustrates a system architecture 300 for a converged advertisement platform according to various embodiments. In some embodiments, the components of system 300 may be implemented as separate functions through any combination of software and hardware, and may be distributed across a number of different devices and/or servers.

With reference to FIGS. 1-3, the system 300 may be similar to the communications system 100, and may be implemented by a service provider offering broadcast/cable television services to customers (e.g., a content distribution network).

In some embodiments, the system 300 may include an encoder 302 and a splicer 304. The splicer 304 may include, for example, Digital Content Manager (DCM), virtual DCM (vDCM), ARRIS CherryPicker Application Platform (CAP), and/or other equipment and technologies. The encoder 302 may receive a media stream and SCTE-35 signal that has been modified to include addressable information. As described, SCTE-35 signals are event signaling messages in the MPEG transport stream that identify advertising breaks by indicating where content distributors can insert, replace, or splice content into the stream. Such modification may have been done, for example, by a programming opportunity conditioning entity.

The encoder 302 may output the modified SCTE-35 signal and video stream to the splicer 304. In some embodiments, the splicer 304 may continuously scan the stream for SCTE-35 signals, and may send a SCTE-30 cue request message to the processing system to initiate the ad insertion process upon detection.

The system 300 may include an ad insertion server 306, which may be one or more component/module responsible for providing advanced advertising services for a service provider network. The ad insertion server 306, in conjunction with other system components may support and/or provide various functions, including server-side pre-caching of secondary content, and integration with ad management systems through one or more plugins.

In various embodiments, the splicer 304 may send a SCTE-30 cue request to the ad insertion server 306 to notify the ad insertion server 306 about an upcoming advertising break. The ad insertion server 306 may have a local ad break schedule, such as a Cable Computerized Management Systems (CCMS) schedule, pre-loaded in memory. Alternatively, the ad insertion server 306 may access/retrieve such schedule from another advertising server if not pre-loaded. The advertising insertion server 306 may use a broadcasting schedule, e.g. CCMS schedule or SCTE-244 schedule to identify the type of spots in an upcoming break, which may be derived from the prefix of the Spot ID within the schedule file. In some embodiments, the ad insertion server 306 may classify each ad spot within the break as being pre-scheduled, addressable, or dynamic. In some embodiments, the ad insertion server 306 may determine that a channel has no schedule, and classify all ad spots within the upcoming break on that channel as dynamic.

In various embodiments, for breaks that include only pre-scheduled spots, the ad insertion server 306 may map each Spot ID to an address (e.g., a uniform resource locator (URL)) in a content distribution network (CDN) 308 from which the pre-selected ad asset may be downloaded. In various embodiments, the ad insertion server 306 may send an SCTE-30 splice request to the splicer 304, and stream the pre-selected assets as default ads to be spliced into the media stream, replacing the embedded advertisements at the splicer 304 output. In various embodiments, the splicer 304 may output the channel content containing such default ads to an SDV entity 310. The SDV entity 310 may use quadrature amplitude modulation (QAM) channels to distribute the media stream with inserted secondary content to customer STBs 312.

The system 300 may include an ad decision server 314. In various embodiments, the ad decision server 314 is one or more component/module responsible for advertisement campaign management, reporting, and ad targeting and ad video selection to be displayed to a particular consumer or group of consumers. The ad decision server 314, in conjunction with other system components, support and/or provide functions including processing and delivering ad placement requests, filtering out non-applicable ads based on customer device responses, applying targeting criteria for customers or groups of customers, and processing ad impression statistics from a data collection service. In various embodiments, the service provider may configure audience measurement via an ad service web user interface to control privacy and data entity transformation rules that enable the service provider control of data delivery.

In some embodiments, the ad insertion server 306 may implement scripted plugins of a data collection service to collect audience measurement data, which may be delivered to the ad decision server 314. The ad decision server 314 may utilize such information along with other information from the service provider to build a profile for each set-top box. Based on the audience measurement data and the current state of advertising campaigns, the ad decision server 314 may select and identify ads to be played during certain spots according to various embodiments.

In instances in which a break that includes at least one dynamic spot is upcoming, including spots on a channel for which there is no schedule, the ad insertion server 306 may communicate directly with the ad decision server 314 to get information identifying which ad asset(s) should be used (e.g., through VAST and/or Video Multiple Ad Playlist (VMAP) requests and response messages).

In various embodiments, the ad decision server 314 may be in communication with a programmer server 318 to obtain information about various advertisement campaigns. Further, the ad decision server 314 may access subscriber information 320 to obtain demographics relating to channels and current programming. In various embodiments, the ad decision server 314 may select an appropriate ad asset for each dynamic spot, and identify such asset(s) to the ad insertion server 306. In turn, the ad insertion server 306 may download the identified ad asset(s) from the CDN 308. In various embodiments, the ad decision server 314 may include in the response a placeholder for any pre-scheduled spot in the break, for which the ad insertion server 306 may use the advertisement decisions set forth in the schedule.

In various embodiments, the ad insertion server 306 may send an SCTE-30 splice request to the splicer 304, and stream the downloaded ad assets as default ads to the splicer 304. The splicer 304 may insert such default ads into the media stream, and output channel content containing media (e.g., video/audio), inserted default ads, and SCTE-35 ad triggers to the SDV entity 310 for distribution to customer STBs 312.

For an upcoming break that includes at least one addressable spot, the ad insertion server 306 may communicate with the ad decision server 314 through a proxy (i.e., ADS proxy) implemented on a client ad server unit 322. Specifically, the ad insertion server 306 may send a VAST/VMAP request to the client ad server unit 322, which may forward the break and addressable information to the ad decision server 314. In various embodiments, the client ad server unit 322 may send triggers to the STBs 312 with information about the upcoming break (e.g., IP address/port of the client ad server unit, the break ID, etc.).

One or more STB 312 may send an ad selection request along with a device identifier back to the ad decision server 314 through the ADS proxy. In various embodiments, the ad decision server 314 may access subscriber information 320 to link the STB device identifier to information about the user and/or to obtain information about subscriber demographics. Such information, along with the particular channel to which the STB is tuned, may be used among other data to select advertisement variants for the addressable spot(s).

The ad decision server 314 may send a VAST/VMAP response identifying assets for the duration of the break to the client ad server unit 322, and through the ADS proxy, to the ad insertion server 306. The client ad server unit 322 may use the information in the response to download any identified variants from the CDN 308, and may forward information about default ads for each addressable spots to the ad insertion server 306. The ad insertion server 306 may download the identified ad asset(s) from the CDN 308.

In various embodiments, the response from the ADS proxy forwarded to the ad insertion server 306 may include a placeholder for any pre-scheduled spot in the break, for which the ad insertion server 306 may use the advertisement decisions set forth in the schedule.

In various embodiments, the ad insertion server 306 may send an SCTE-30 splice request to the splicer 304, and stream the downloaded ad assets as default ads to the splicer 304. The splicer 304 may insert such default ads into the media stream, and output channel content containing media (e.g., video/audio), the inserted default ads to the SDV entity 310 for distribution to the STBs 312. Using multicast or unicast transmission, the client ad server unit 322 may stream the appropriate ad variants to the SDV 310 for delivery to the STB(s) 312.

Figure 4A:
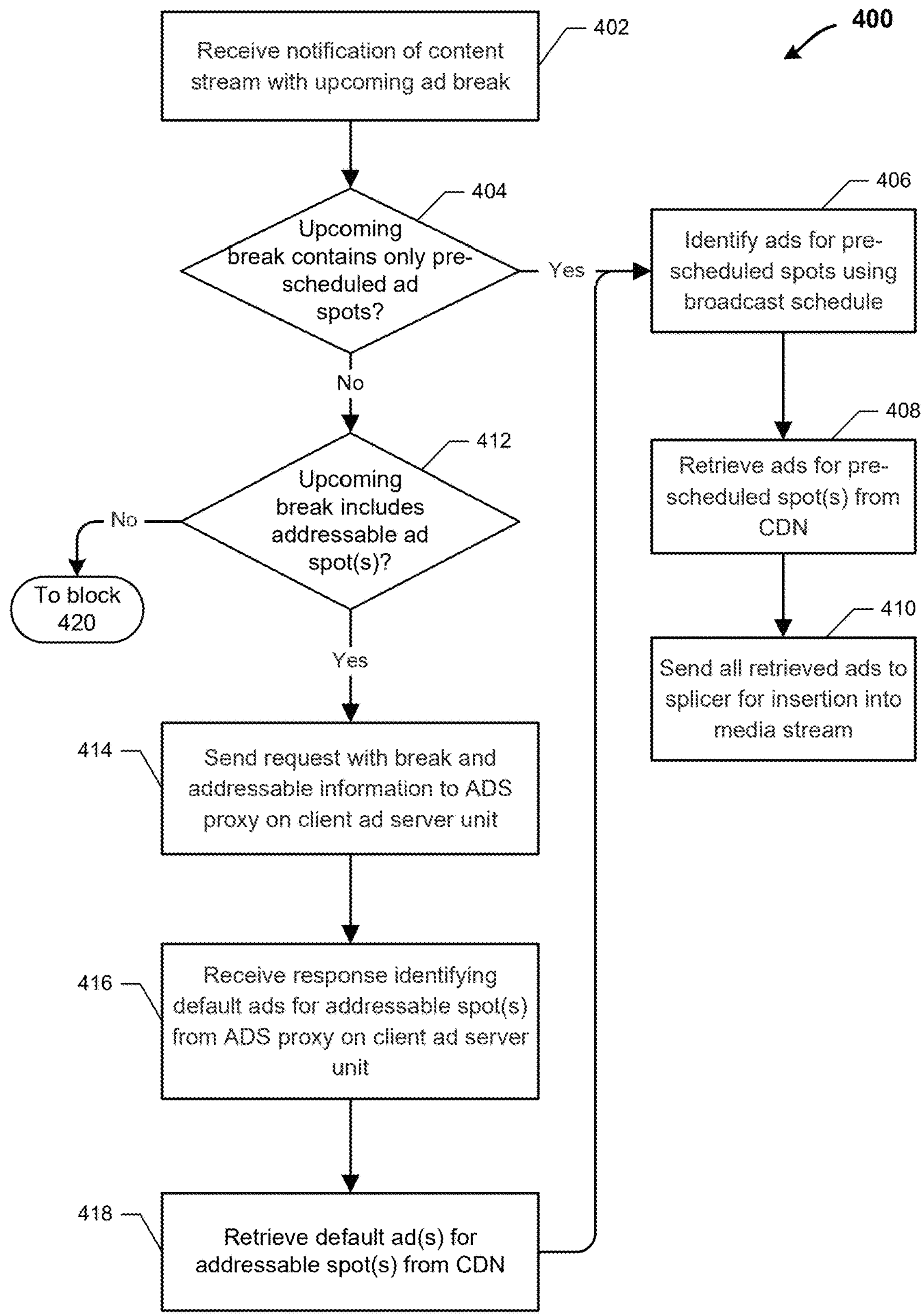
FIGS. 4A and 4B are process flow diagrams illustrating a method of supporting various types of advertisement spots within a service provider network.
Figure 4B:
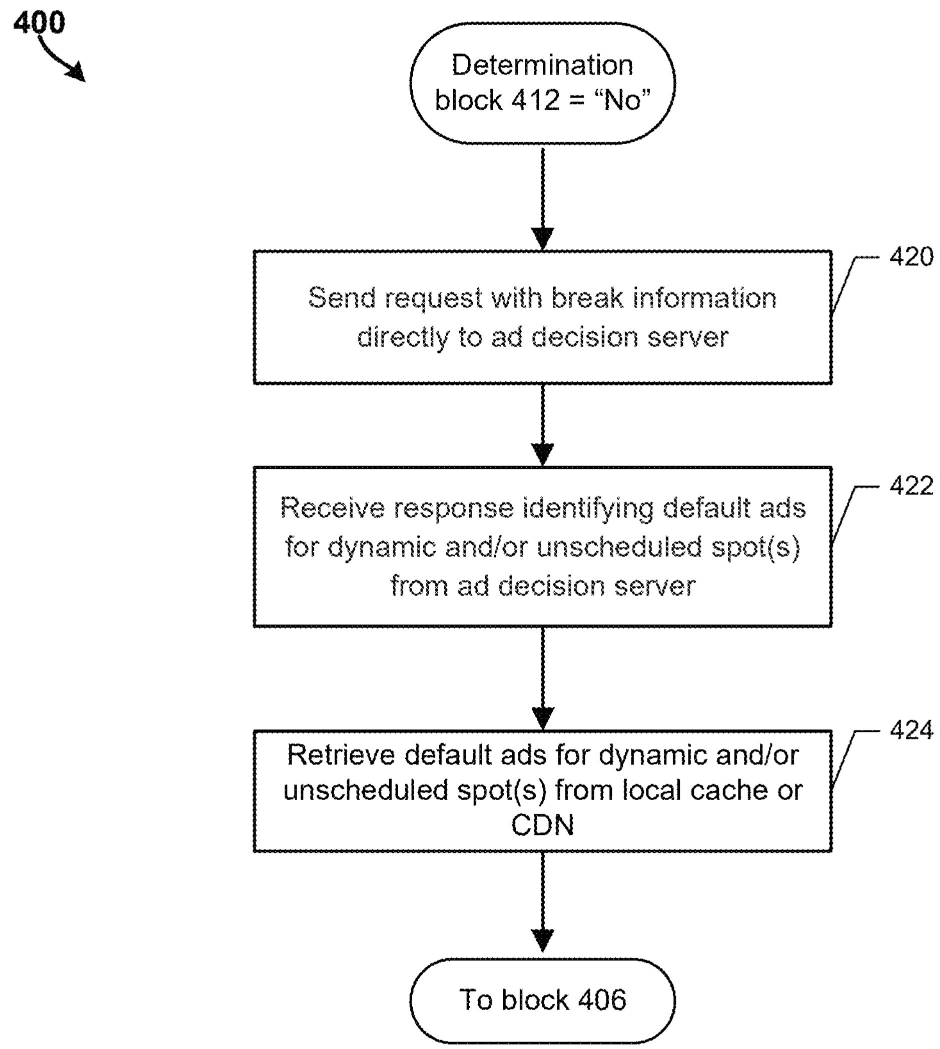

FIGS. 4A and 4B are process flow diagrams illustrating a method 400 of supporting a variety of ad spot types and networks in a single platform. With reference to FIGS. 1-4B, the operations of method 400 may be implemented by one or more entity within the converged advertisement platform 300, such as a server computing device (e.g., the ad insertion server 306). Specifically, one or more processor of the at least one server computing device may be configured with software or firmware to perform some or all of such operations. Operations of method 400 may additionally or alternatively be implemented by one or more control entity within the service provider network (e.g., 116). In order to encompass the alternative configurations enabled in various embodiments, the hardware implementing any or all of the method 400 may be referred to herein as the "server computing device" or "at least one processor" thereof, or "at least one processor."

In block 402, the server computing device may receive a notification of a media stream (e.g., audio/visual content) that includes an upcoming ad break. In some embodiments, the notification may be received from a splicer, and may be in the form of SCTE-30 cue request messages.

In determination block 404, the server computing device may determine whether the upcoming break contains only pre-scheduled ad spots. In various embodiments, such determination may be based on the notification received in block 402.

In response to determining that the upcoming break contains only pre-scheduled ad spots (i.e., determination block 404="Yes"), the server computing device may identify the ads to be inserted into the pre-scheduled spots during the upcoming break using a broadcasting schedule in block 406. Such schedule may be, for example, a pre-loaded broadcasting schedule saved on the server computing device. In some embodiments, the schedule may include various ad spot attributes.

In block 408, the server computing device may retrieve the identified ads for the pre-scheduled spots from a CDN. In instances in which such ads have been previously downloaded, retrieving may involve accessing a local cache on the server computing device. In instances in which the ads have not previously been downloaded, retrieving may involve downloading the ad asset(s) at that time from the CDN.

In block 410, the server computing device may send all retrieved ads to the splicer for insertion into the media content stream. In some embodiments, the insertion may use the SCTE-30 interface (e.g., SCTE-30 splice request).

In response to determining that the upcoming break does not contain only pre-scheduled spots (i.e., determination block 404="No"), the server computing device may determine whether the upcoming break includes any addressable ad spots in determination block 412.

In response to determining that the upcoming break includes addressable ad spot(s) (i.e., determination block 412="Yes"), the server computing device may send a request with information about the ad break and addressable information to an ad decision server through a proxy hosted by a client ad server unit in block 414. In various embodiments, the request to the ad decision server proxy (ADS proxy) may be in the form of a VAST and/or VMAP request message.

In block 416, the server computing device may receive, from the ADS proxy on the client ad server unit, a response identifying default ad(s) corresponding to the addressable spot(s). In various embodiments, the response message may be derived from a VAST/VMAP response to the client ad server unit, which is then forwarded to the server computing device. The response may include information identifying default ad assets across the duration signaled in the request, and may contain a placeholder for any pre-scheduled spots within the ad break.

In block 418, the server computing device may retrieve the identified default ad(s) for the addressable spot(s) from the CDN. If the default ads have been previously downloaded, retrieving may involve accessing a local cache on the server computing device. If the default ads have not previously been downloaded, retrieving may involve downloading the ad asset(s) at that time from the CDN.

The server computing device may return to block 406 to identify ads for any pre-scheduled spots using the broadcasting schedule (e.g., CCMS schedule or SCTE-224 schedule).

In response to determining that the upcoming break does not include any addressable ad spots (i.e., determination block 412="No"), the server computing device may send a request with information about the upcoming ad break directly to the ad decision server in block 420. In various embodiments, the request sent directly to the ad decision server may be in the form of a VAST/VMAP request. Spots within the upcoming break that may be identified in the VAST/VMAP request may include dynamic spots and/or spots on channels for which there is no schedule (i.e., unscheduled spots).

In block 422, the server computing device may receive, from the ad decision server, a response identifying default ad(s) corresponding to any dynamic and/or unscheduled spots. In various embodiments, the response message may be in the form of a VAST/VMAP response. The response message may include information identifying default ad assets across the duration signaled in the request, and may contain a placeholder for any pre-scheduled spots within the upcoming ad break.

In block 424, the server computing device may retrieve the identified default ad(s) for any dynamic and/or unscheduled spot(s) from the CDN. If the default ads have been previously downloaded, retrieval may involve accessing a local cache on the server computing device. If the default ads have not previously been downloaded, retrieval may involve downloading the ad asset(s) at that time from the CDN.

The server computing device may return to block 406 to identify ads for any pre-scheduled spots using the broadcasting schedule (e.g., CCMS schedule or SCTE-224 schedule).

Figure 5:
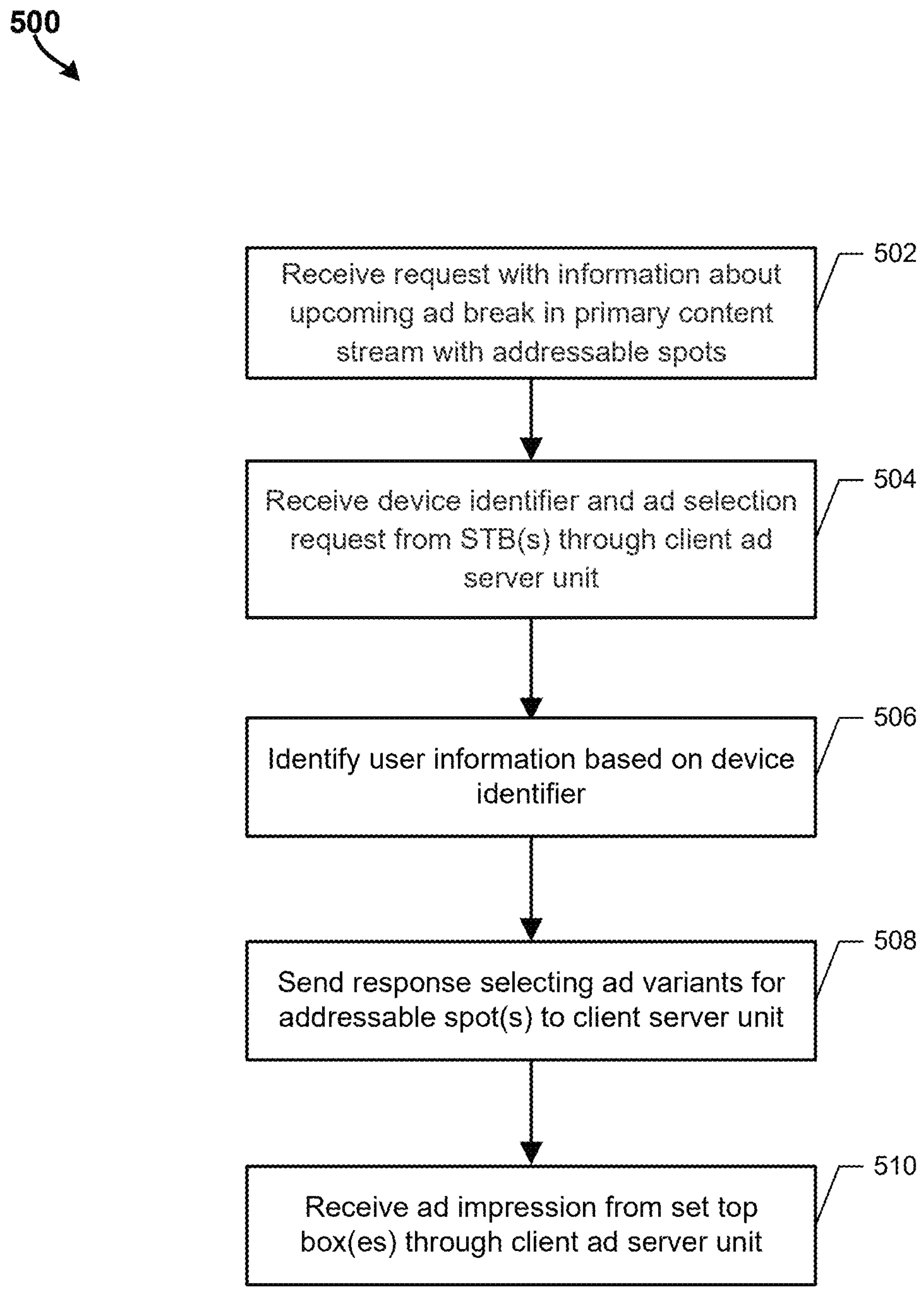
FIG. 5 is a process flow diagram illustrating a method of supporting real-time advertisement decision-making for addressable spots within an advertisement break.

FIG. 5 is a process flow diagram illustrating a method 500 of supporting real-time ad decision-making for addressable spots in an ad break. With reference to FIGS. 1-5, the operations of method 500 may be implemented by a server computing device, such as the ad decision server 314. Specifically, one or more processor of the at least one server computing device may be configured with software or firmware to perform some or all of such operations.

Operations of method 500 may additionally or alternatively be implemented by one or more control entity within the service provider network (e.g., 116). In order to encompass the alternative configurations enabled in various embodiments, the hardware implementing any or all of the method 500 may be referred to herein as the "server computing device" or "at least one processor" thereof, or "at least one processor."

In block 502, the server computing device may receive a request with information about an upcoming ad break in a primary content stream, and any addressable ad spots therein. In some embodiments, the request may be a VAST/VMAP request message from an ad insertion server (e.g., 306) that is received through a proxy hosted on a client ad server unit (e.g., 322). In block 504, the server computing device may receive, through the client ad server unit, a device identifier and ad selection request from one or more STB. In some embodiments, the device identifier and ad selection request may be received as a result of trigger messages being sent by the client ad server unit to the STB(s). In some embodiments, the device identifier may be a MAC address or other hardware identifier.

In block 506, the server computing device may identify user information for the STB(s) based on the received device identifier. In some embodiments, the server computing device may access subscriber information stored on one or more entity of the service provider network to develop a profile corresponding to STBs (e.g., demographics, viewing history, etc.), which may be linked to the device identifiers. In various embodiments, the server computing device may partition ads into distinct allocations of variants to support more even selection and ad delivery across ads of various priorities and audience sizes.

In block 508, the server computing device may send a response identifying ad variant(s) corresponding to addressable spots in the upcoming break to the client ad server unit. In various embodiments, the response may be in the form of a VAST/VMAP response message. In various embodiments, the client ad server unit may stream selected ad variants to SDV channels using UDP multicast or unicast, and may send tuning information for relevant ad variant(s) to the STB(s). As a result, the STB(s) may stay on the current SDV channel where a default ad is inserted, or tune to a variant on a different SDV channel.

In block 510, the server computing device may receive ad impression data from the STB(s) through the client ad server unit after ads have played. In some embodiments, a data collection service may be used to aggregate ad impression data from many STBs within a market or viewing group, and report the aggregated data to the server computing device.

Figure 6:
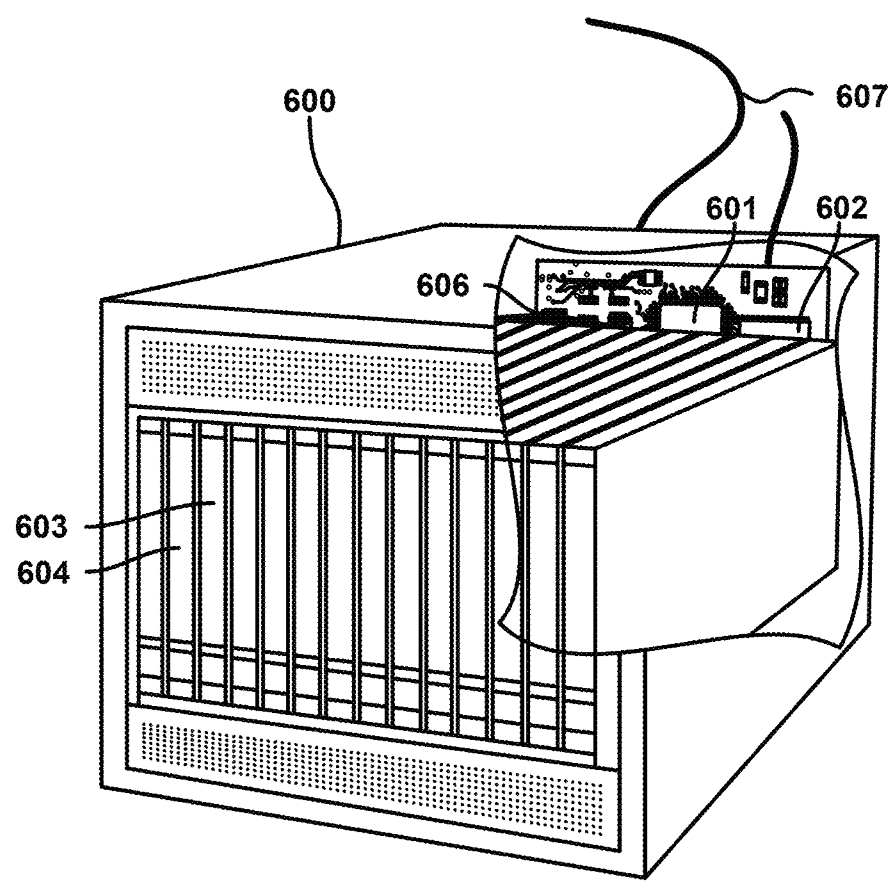
FIG. 6 is a component diagram of an example server suitable for implementing some embodiments.

Some embodiments may be implemented on any of a variety of commercially available computing devices, such as the server computing device 600 illustrated in FIG. 6. Such a server device 600 may include a processor 601 coupled to volatile memory 602 and a large capacity nonvolatile memory, such as a disk drive 603. The server device 600 may also include a floppy disc drive, USB, etc. coupled to the processor 601. The server device 600 may also include network access ports 606 coupled to the processor 601 for establishing data connections with a network connection circuit 604 and a communication network 607 (e.g., an Internet protocol (IP) network) coupled to other communication system network elements.

The processors or processing units discussed in this application may be any programmable microprocessor, microcomputer, or multiple processor chip or chips that can be configured by software instructions (applications) to perform a variety of functions, including the functions of various embodiments described. In some computing devices, multiple processors may be provided, such as one processor within first circuitry dedicated to wireless communication functions and one processor within a second circuitry dedicated to running other applications. Software applications may be stored in the memory before they are accessed and loaded into the processor. The processors may include internal memory sufficient to store the application software instructions.

Implementation examples are described in the following paragraphs. While some of the following implementation examples are described in terms of example methods, further example implementations may include: the example methods discussed in the following paragraphs implemented by a computing device including a processor configured (e.g., with processor-executable instructions) to perform operations of the methods of the following implementation examples; the example methods discussed in the following paragraphs implemented by a computing device including means for performing functions of the methods of the following implementation examples; and the example methods discussed in the following paragraphs may be implemented as a non-transitory processor-readable storage medium having stored thereon processor-executable instructions configured to cause a processor of a computing device to perform the operations of the methods of the following implementation examples.

A number of different types of memories and memory technologies are available or contemplated in the future, any or all of which may be included and used in systems and computing devices that implement the various embodiments. Such memory technologies/types may include dynamic random-access memory (DRAM), double data rate synchronous dynamic random-access memory (DDR SDRAM), electronic (Solid-State) non-volatile computer storage mediums (e.g., Flash Memory), ferroelectric RAM (F-RAM), field programmable read-only memory (FPROM), magnetoresistive RAM (M-RAM), non-volatile random-access memories (NVRAM), one-time programmable non-volatile memory (OTP NVM), phase-change random-access memory (PC-RAM, PRAM, or PCM), programmable read-only memory (PROM), pseudostatic random-access memory (PSRAM), resistive random access memory (ReRAM or RRAM), spin-transfer torque magnetoresistive random-access memory (STT-MRAM), static random-access memory (SRAM), three-dimensional cross point (3D XPoint) memory. Each of the above-mentioned memory technologies includes, for example, elements suitable for storing instructions, programs, control signals, and/or data for use in a computing device, system on chip (SOC) or other electronic component. Any references to terminology and/or technical details related to an individual type of memory, interface, standard, or memory technology are for illustrative purposes only, and not intended to limit the scope of the claims to a particular memory system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods may be substituted for or combined with one or more operations of the methods.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general-purpose processor, a digital signal processor (DSP), an application-specific integrated circuit (TCUASIC), a field programmable gate array (FPGA) or other programmable logic devices, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store target program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method of supporting advertisement (ad) insertion into a media stream within a content delivery network, the method comprising:

receiving, by one or more server computing device in the content delivery network, notification of an upcoming ad break within the media stream;

determining, by the one or more server computing device, whether the upcoming ad break contains only pre-scheduled spots; and in response to determining that the upcoming ad break does not contain only pre-scheduled spots:

determining, by the one or more server computing device, whether the upcoming ad break includes any addressable spot based on a broadcasting schedule stored on the one or more server computing device; and in response to determining that the upcoming ad break includes at least one addressable spot:

sending, by the one or more server computing device, a request with information about the at least one addressable spot and the upcoming ad break to an ad decision server proxy (ADS proxy) hosted by a client ad server unit within the content distribution network;

receiving, by the one or more server computing device, a response message from the ADS proxy, wherein the response message identifies a default asset for each of the at least one addressable spot;

retrieving, by the one or more server computing device, the at least one default asset from a content distribution network (CDN); and sending, by the one or more server computing device, the at least one default asset to a splicer for insertion within the media stream.

2. The method of claim 1, wherein the response message from the ADS proxy includes a placeholder for any pre-scheduled spot within the upcoming ad break.

3. The method of claim 1, wherein:

sending the request with information about the at least one addressable spot and the upcoming ad break to the ADS proxy comprises sending a video ad serving template (VAST) request message; and receiving the response message from the ADS proxy comprises receiving a VAST response generated by the ad decision server.

4. The method of claim 1, wherein retrieving the at least one default asset from the CDN comprises:

determining, by the one or more computing device, whether the at least one default asset is available in a local cache from previous download; and downloading, by the one or more computing device, the at least one default asset from the CDN in response to determining that the at least one default asset is not available in a local cache.

5. The method of claim 1, further comprising, in response to determining that the upcoming ad break contains only pre-scheduled spots:

identifying, by the one or more one server computing device, a pre-selected asset for each spot in the upcoming ad break based on the broadcasting schedule;

retrieving, by the one or more server computing device, the identified pre-selected assets from the CDN; and sending, by the one or more server computing device, the pre-selected assets to the splicer for insertion within the content stream.

6. The method of claim 5, wherein retrieving the identified pre-selected assets from the CDN comprises:

determining, by the one or more computing device, whether each identified pre-selected asset is available in a local cache from a previous download; and downloading from the CDN, by the one or more computing device, any pre-selected asset not available in a local cache from a previous download.

7. The method of claim 1, further comprising, in response to determining that the upcoming ad break does not include any addressable spots:

sending, by the one or more computing device, a request to the ad decision server, wherein the request includes information identifying all dynamic spots within the upcoming ad break;

receiving, by the one or more computing device, a response message from the ad decision server identifying a default asset for each dynamic spot within the upcoming ad break;

retrieving, by the one or more computing device, the identified default asset for each dynamic spot; and sending, by the one or more server computing device, the retrieved default assets for each dynamic spot to the splicer for insertion within the content stream.

8. The method of claim 7, wherein the response from the ad decision server includes a placeholder for any pre-scheduled spot within the upcoming ad break.

9. The method of claim 7, wherein retrieving the identified default asset for each dynamic spot comprises:

determining, by the one or more computing device, whether the identified default asset is available in a local cache from a previous download; and downloading, by the one or more computing device, the identified default asset from the CDN in response to determining that the identified default asset is not available in a local cache from a previous download.

10. The method of claim 7, wherein:

the request sent to the ad decision server comprises a video ad serving template (VAST) request message; and the response message received from the ad decision server identifying a default asset for each dynamic spot comprises a VAST response message.

11. The method of claim 1, further comprising:

downloading, by the one or more server computing device, the broadcasting schedule from the ad decision server.

12. A server computing device, comprising:

a processor configured with processor-executable instructions to:

receive notification of an upcoming advertisement (ad) break in a media stream within a content delivery network;

determine whether the upcoming ad break contains only pre-scheduled spots; and in response to determining that the upcoming ad break does not contain only pre-scheduled spots:

determine whether the upcoming ad break includes any addressable spot based on a stored broadcasting schedule; and in response to determining that the upcoming ad break includes at least one addressable spot:

send a request with information about the at least one addressable spot and the upcoming ad break to an ad decision server proxy (ADS proxy) hosted by a client ad server unit within the content delivery network;

receive a response message from the ADS proxy, wherein the response message identifies a default asset for each of the at least one addressable spot;

retrieve the at least one default asset from a content distribution network (CDN); and send the at least one default asset to a splicer for insertion within the media stream.

13. The server computing device of claim 12, wherein the response message from the ADS proxy includes a placeholder for any pre-scheduled spot within the upcoming ad break.

14. The server computing device of claim 12, wherein:

the request with information about the at least one addressable spot and the upcoming ad break sent to the ADS proxy comprises a video ad serving template (VAST) request message; and the response message from the ADS proxy comprises a VAST response generated by the ad decision server.

15. The server computing device of claim 12, wherein the processor is configured to retrieve the at least one default asset from the CDN by:

determining whether the at least one default asset is available in a local cache from previous download; and downloading the at least one default asset from the CDN in response to determining that the at least one default asset is not available in a local cache.

16. The server computing device of claim 12, wherein the processor is further configured with processor-executable instructions to, in response to determining that the upcoming ad break contains only pre-scheduled spots:

identify a pre-selected asset for each spot in the upcoming ad break based on the broadcasting schedule;

retrieve the identified pre-selected assets from the CDN; and send the pre-selected assets to the splicer for insertion within the content stream.

17. The server computing device of claim 16, wherein the processor is configured to retrieve the identified pre-selected assets from the CDN by:

determining whether each identified pre-selected asset is available in a local cache from a previous download; and downloading from the CDN any pre-selected asset not available in a local cache from a previous download.

18. The server computing device of claim 12, wherein the processor is further configured with processor-executable instructions to, in response to determining that the upcoming ad break does not include any addressable spots:

send a request to the ad decision server, wherein the request includes information identifying all dynamic spots within the upcoming ad break;

receive a response message from the ad decision server identifying a default asset for each dynamic spot within the upcoming ad break;

retrieve the identified default asset for each dynamic spot; and send the retrieved default assets for each dynamic spot to the splicer for insertion within the content stream.

19. The server computing device of claim 18, wherein the response from the ad decision server includes a placeholder for any pre-scheduled spot within the upcoming ad break.

20. The server computing device of claim 18, wherein the processor is configured to retrieve the identified default asset for each dynamic spot by:

determining whether the identified default asset is available in a local cache from a previous download; and downloading the identified default asset from the CDN in response to determining that the identified default asset is not available in a local cache from a previous download.

21. The server computing device of claim 18, wherein:

the request sent to the ad decision server comprises a video ad serving template (VAST) request message; and the response message received from the ad decision server identifying a default asset for each dynamic spot comprises a VAST response message.

22. The server computing device of claim 12, wherein the processor is further configured with processor-executable instructions to download the broadcasting schedule from the ad decision server.

23. A non-transitory computer readable storage medium having stored thereon processor-executable software instructions configured to cause a server processor to perform operations for supporting advertisement (ad) insertion into a media stream within a content delivery network, the operations comprising:

receiving notification of an upcoming ad break within the media stream;

determining whether the upcoming ad break contains only pre-scheduled spots; and in response to determining that the upcoming ad break does not contain only pre-scheduled spots:

determining whether the upcoming ad break includes any addressable spot based on a broadcasting schedule stored on the one or more server computing device; and in response to determining that the upcoming ad break includes at least one addressable spot:

sending a request with information about the at least one addressable spot and the upcoming ad break to an ad decision server proxy (ADS proxy) hosted by a client ad server unit within the content delivery network;

receiving a response message from the ADS proxy, wherein the response message identifies a default asset for each of the at least one addressable spot;

retrieving the at least one default asset from a content distribution network (CDN); and sending the at least one default asset to a splicer for insertion within the media stream.

24. The non-transitory computer readable storage medium of claim 23, wherein the stored processor-executable software instructions are configured to cause the server processor to perform operations such that the response message from the ADS proxy includes a placeholder for any pre-scheduled spot within the upcoming ad break.

25. The non-transitory computer readable storage medium of claim 23, wherein:

the request with information about the at least one addressable spot and the upcoming ad break sent to the ADS proxy comprises a video ad serving template (VAST) request message; and the response message from the ADS proxy comprises a VAST response generated by the ad decision server.

26. The non-transitory computer readable storage medium of claim 23, wherein the stored processor-executable software instructions are configured to cause the server processor to perform operations such that retrieving the at least one default asset from the CDN comprises:

determining whether the at least one default asset is available in a local cache from previous download; and downloading the at least one default asset from the CDN in response to determining that the at least one default asset is not available in a local cache.

27. The non-transitory computer readable storage medium of claim 23, wherein the stored processor-executable software instructions are configured to cause the server processor to perform operations further comprising, in response to determining that the upcoming ad break contains only pre-scheduled spots:

identifying a pre-selected asset for each spot in the upcoming ad break based on the broadcasting schedule;

retrieving the identified pre-selected assets from the CDN; and sending the pre-selected assets to the splicer for insertion within the content stream.

28. The non-transitory computer readable storage medium of claim 27, wherein the stored processor-executable software instructions are configured to cause the server processor to perform operations such that retrieving the identified pre-selected assets from the CDN comprises:

determining whether each identified pre-selected asset is available in a local cache from a previous download; and downloading from the CDN any pre-selected asset not available in a local cache from a previous download.

29. The non-transitory computer readable storage medium of claim 23, wherein the stored processor-executable software instructions are configured to cause the server processor to perform operations further comprising, in response to determining that the upcoming ad break does not include any addressable spots:

sending a request to the ad decision server, wherein the request includes information identifying all dynamic spots within the upcoming ad break;

receiving a response message from the ad decision server identifying a default asset for each dynamic spot within the upcoming ad break;

retrieving the identified default asset for each dynamic spot; and sending the retrieved default assets for each dynamic spot to the splicer for insertion within the content stream.

30. The non-transitory computer readable storage medium of claim 29, wherein the response from the ad decision server includes a placeholder for any pre-scheduled spot within the upcoming ad break.

* * * * *